United States Patent
Cho

(10) Patent No.: US 9,591,292 B2
(45) Date of Patent: Mar. 7, 2017

(54) DISPLAY DEVICE AND CONTROL METHOD THEREOF

(71) Applicant: SAMSUNG ELECTRONICS CO., LTD., Suwon-si (KR)

(72) Inventor: Yong-rae Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 311 days.

(21) Appl. No.: 14/313,656

(22) Filed: Jun. 24, 2014

(65) Prior Publication Data

US 2015/0097934 A1   Apr. 9, 2015

(30) Foreign Application Priority Data

Oct. 7, 2013 (KR) .................. 10-2013-0119048

(51) Int. Cl.
H04N 13/04 (2006.01)
(52) U.S. Cl.
CPC .............................. *H04N 13/0404* (2013.01)
(58) Field of Classification Search
CPC ........................ H04N 13/0404; H04N 13/04
See application file for complete search history.

(56) References Cited

U.S. PATENT DOCUMENTS

| 9,264,700 B2 * | 2/2016 | Lee ................... H04N 13/0404 |
| 2007/0296808 A1 * | 12/2007 | Hong ................... G02B 27/026 348/42 |
| 2010/0002006 A1 * | 1/2010 | Mauchly ............ H04N 13/0497 345/581 |
| 2013/0088481 A1 * | 4/2013 | Kim ................... H04N 13/0434 345/212 |
| 2015/0234196 A1 * | 8/2015 | Ohbitsu ............. G02B 27/2214 359/463 |

FOREIGN PATENT DOCUMENTS

KR   10-2011-0084660 A   7/2011

* cited by examiner

*Primary Examiner* — Dave Czekaj
*Assistant Examiner* — Tsion B Owens
(74) *Attorney, Agent, or Firm* — Sughrue Mion, PLLC

(57) ABSTRACT

Disclosed is a display device and a display method. The display device includes: an image processor which is capable of processing a plurality of images comprising a first image and auxiliary images that may be selectively displayed together with the first image; a display which displays the plurality of images thereon by making the auxiliary images visible corresponding to viewing angles; and a controller which controls the plurality of images to comprise at least one of a first auxiliary image, a second auxiliary image that is different from the first auxiliary image and a third auxiliary image that is used to reduce an interference between the first and second auxiliary image.

13 Claims, 12 Drawing Sheets

FIG. 11
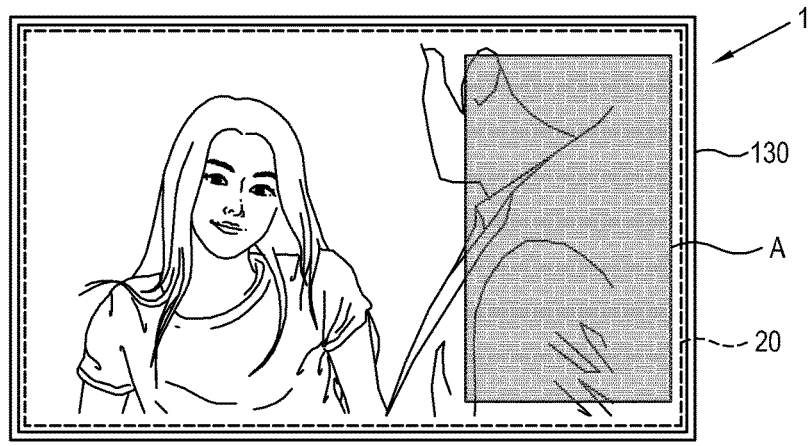
(a)
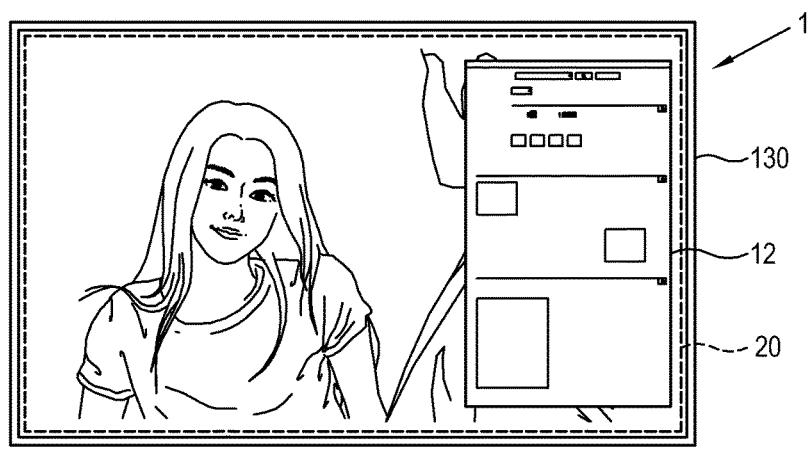
(b)
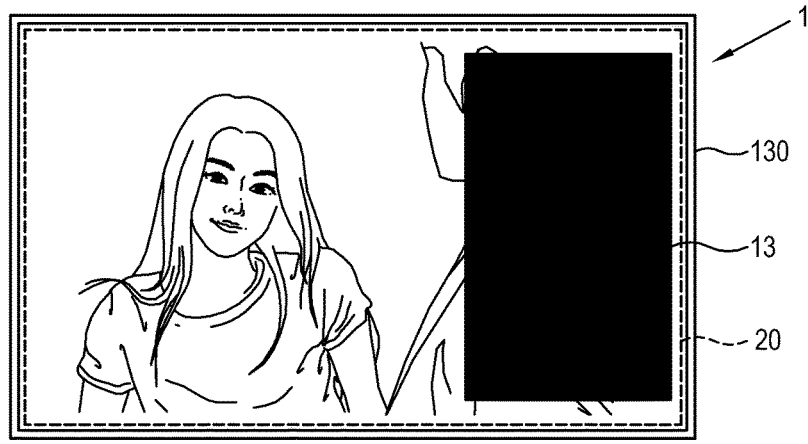
(c)

DISPLAY DEVICE AND CONTROL METHOD THEREOF

CROSS-REFERENCE TO RELATED APPLICATION

This application claims priority from Korean Patent Application No. 10-2013-0119048, filed on Oct. 7, 2013 in the Korean Intellectual Property Office, the disclosure of which is incorporated herein by reference.

BACKGROUND

Field

Apparatuses and methods consistent with exemplary embodiments relate to a display device and a control method thereof, and more particularly, to a display device and a control method thereof which is capable of producing different auxiliary images visible corresponding to respective viewing angles while a plurality of users view a main image displayed on a display.

Description of the Related Art

A display apparatus, such as a smart television (TV), which enables a plurality of users to view desired images through a single display device, is widely used. The plurality of viewers may receive and view different images or view three dimensional (3D) images on the display apparatus through glasses. Also, the plurality of viewers may view different images from different locations, i.e., at different viewing angles without wearing glasses. When the plurality of viewers view different images as above, image frames need to be divided to be transmitted to the plurality of viewers, and thus the plurality of users may view an image with a resolution that is reduced according to the number of the users. Since the number of pixels of the display apparatus is reduced by the number of users, brightness of a displayed image may be reduced accordingly.

Further, there may be a case where one of users viewing different images without glasses may move to another position. In this case, the user may view two images that overlap each other at a boundary area of viewing angles and may feel dizzy.

Also, the plurality of users may opt to view only auxiliary images from among a main image and the auxiliary images. In this case, the plurality of users may view the image with a resolution that is reduced according to the number of the plurality of users. Also, two overlapping images may be viewed when a user moves to another position, e.g., a boundary area of viewing angles.

A user may feel unsatisfied when viewing images with a reduced resolution and also feel uncomfortable when viewing two images that overlap each other caused by the use's movement.

SUMMARY

One or more exemplary embodiments provide a display device and a control method thereof which inserts and displays a predetermined image to reduce interference among images such that a plurality of users may view a main image without deterioration of image quality, to provide auxiliary images visible corresponding to respective viewing angles, and to substantially prevent an overlapping view of the auxiliary images by a user when the user moves.

According to an aspect of an exemplary embodiment, provided is a display device including: an image processor configured to process a plurality of images comprising a first image and at least one second image; a display configured to display the first image in a first region and the at least one second image in a second region, the at least one second image being viewable corresponding to a viewing angle of a user; and a controller configured to provide, as the at least one second image, at least one of a first auxiliary image, a second auxiliary image that is different from the first auxiliary image, and a third auxiliary image that is used to reduce an interference between the first and second auxiliary image.

The controller may adjust a viewing angle of the first, the second and the third auxiliary images according to a location of the user.

The controller may adjust a viewing angle of the third auxiliary image such that the first auxiliary image and the second auxiliary image are not viewable at viewing angles adjacent to each other.

The display device further may include a user interface (UI) generator which generates the first to the third auxiliary images, wherein the controller may control the UI generator to generate a UI to display the first to the third auxiliary images in a predetermined region of the display.

The controller may move a position of at least one of the displayed first to the third auxiliary images.

The third auxiliary image may include a black image.

According to an aspect of another exemplary embodiment, provided is a control method including: processing a plurality of images comprising a first image and at least one second image; displaying the first image in a first region and the at least one second image in a second region, the at least one second image being viewable corresponding to a viewing angle; and providing, as the at least one second image, at least one of a first auxiliary image, a second auxiliary image that is different from the first auxiliary image and a third auxiliary image that is used to reduce an interference between the first and second auxiliary images.

The displaying may include adjusting a viewing angle of the first, the second and the third auxiliary images according to a location of the user.

The displaying may include adjusting a viewing angle of the third auxiliary image such that the first and second auxiliary images are not viewable at viewing angles adjacent to each other.

The displaying may include generating a UI to display the first to the third auxiliary images in a predetermined region of a display.

The displaying may include moving a position of at least one of the displayed first to the third auxiliary images.

According to an aspect of another exemplary embodiment, provided is a display apparatus including: a display configured to display an image viewable to a plurality of users having a plurality of viewing positions relative to the display; and a controller configured to control the display to display a first image in a first region of the display and a second image in a second region of the display, wherein the first image comprises an image commonly viewable to the plurality of users and the second image comprises a plurality of images that are different according to the viewing positions of the plurality of users.

The plurality of images of the second image may include a black image inserted between respective two different images to be displayed corresponding to two adjacent viewing positions.

The second image may include an image substantially the same as the first image, a resolution of the second image being smaller than a resolution of the first image.

According to an aspect of another exemplary embodiment, provided is a non-transitory computer readable recording medium having recorded thereon a program executable by a computer for performing the control method according to a control method including: processing a plurality of images comprising a first image and at least one second image; displaying the first image in a first region and the at least one second image in a second region, the at least one second image being viewable corresponding to a viewing angle; and providing, as the at least one second image, at least one of a first auxiliary image, a second auxiliary image that is different from the first auxiliary image and a third auxiliary image that is used to reduce an interference between the first and second auxiliary images.

According to an aspect of another exemplary embodiment, provided is a display apparatus including: a display configured to display an image viewable to a plurality of users having a plurality of viewing positions relative to the display; and a controller configured to control the display to display a first image in a first region of the display and a second image in a second region of the display, wherein the first image comprises an image commonly viewable to the plurality of users and the second image comprises a plurality of images that are different according to the viewing positions of the plurality of users.

BRIEF DESCRIPTION OF THE DRAWINGS

The above and/or other aspects will become apparent and more readily appreciated from the following description of certain exemplary embodiments, taken in conjunction with the accompanying drawings, in which:

FIGS. 9, 10 and 11 illustrate examples of a user's viewing of a display device according to various exemplary embodiments.

DETAILED DESCRIPTION OF EXEMPLARY EMBODIMENTS

Figure 1:
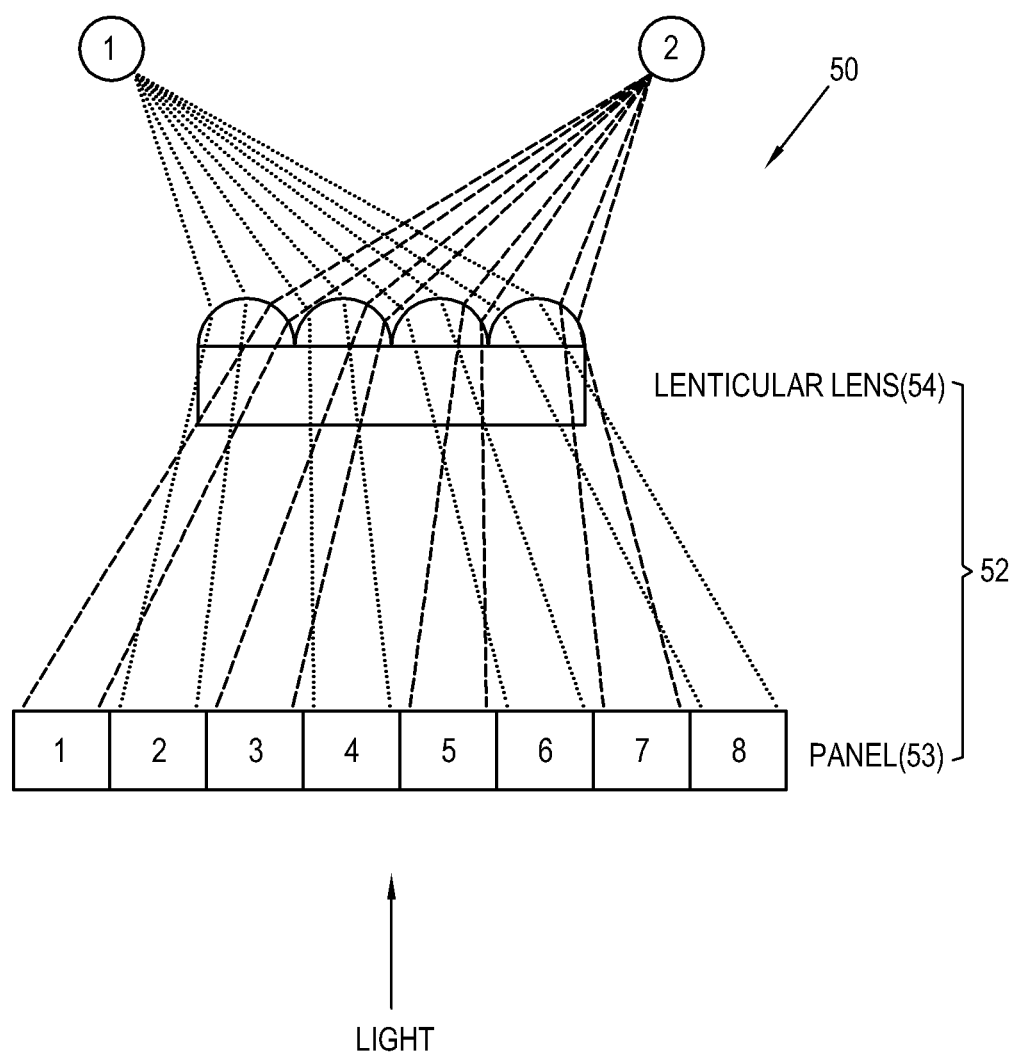
FIGS. 1 to 3 illustrate an example of a lenticular autostereoscopic display according to an exemplary embodiment.

Below, exemplary embodiments will be described in detail with reference to accompanying drawings to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout. It is understood that, hereinafter, expressions such as "at least one of," when preceding a list of elements, modify the entire list of elements and do not modify the individual elements of the list.

FIG. 1 illustrates an example of a lenticular autostereoscopic display according to an exemplary embodiment.

In FIG. 1, a display 52 of a lenticular type autostereoscopic display device 50 displays different images at viewing angles ① and ②.

The display 52 of the autostereoscopic display device 50 includes a backlight and, as shown in FIG. 1, the backlight emits light to a panel 53. The panel 53 is divided into a plurality of sub-panels according to a preset number of users. In FIG. 1, an image is displayed at the two viewing angles ① and ②. The emitted light is output at the viewing angle ② through odd-numbered sub-panels 53, and output at the viewing angle ① through even-numbered sub-panels 53. After passing through the sub-panels 53, the light is output to the lenticular lens 54 at a consistent angle, and due to the angle of the lenticular lens 54, the light of the image is output at respective viewing angles, and two users may view different images, respectively at the viewing angles ① and ②.

Figure 2:
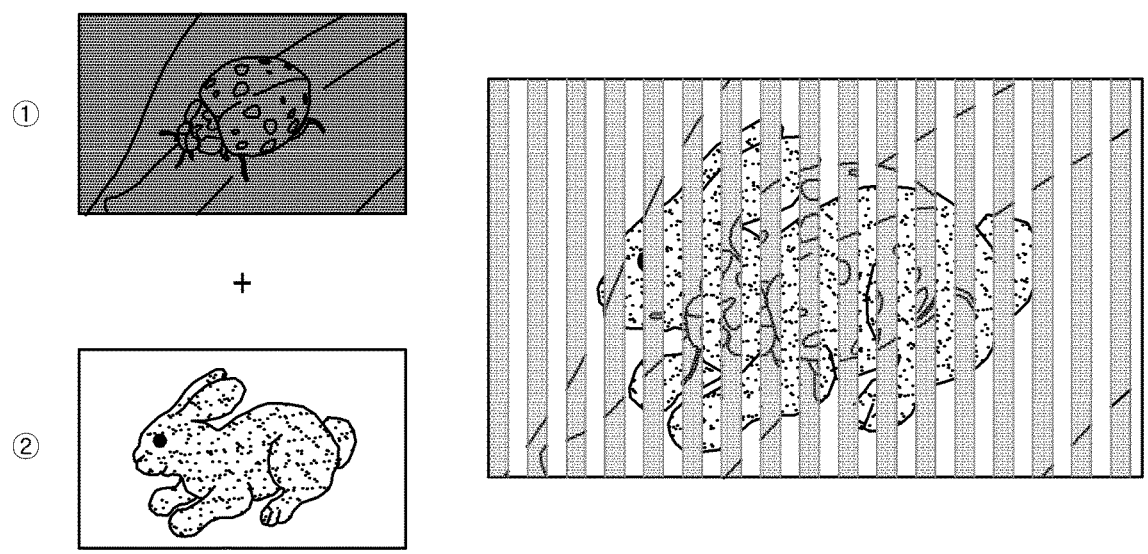

FIG. 2 illustrates an example of a lenticular autostereoscopic 3D display, according to an exemplary embodiment.

As shown therein, respective sub-panels 53 output light corresponding to respective viewing angles, and images ① and ② viewed at the respective viewing angles are shown. Since an image is displayed by dividing a viewing angle into two, a resolution of the image is reduced to half. Thus, the images ① and ② with the reduced resolution are shown at respective viewing angles, compared to one viewing angle. In addition to the resolution, brightness is also reduced to half. Since the viewing angle is divided into two, an area of the panel 53 which outputs an auxiliary image corresponds to a half of an entire area of the panel 53. Thus, the resolution and the brightness of the auxiliary image are reduced compared to a main image.

The lenticular lens 54 and the display panel 53 which are shown in FIG. 1 are examples of the display 52 which displays an image at viewing angles ① and ② by dividing the panel 53.

Figure 3:
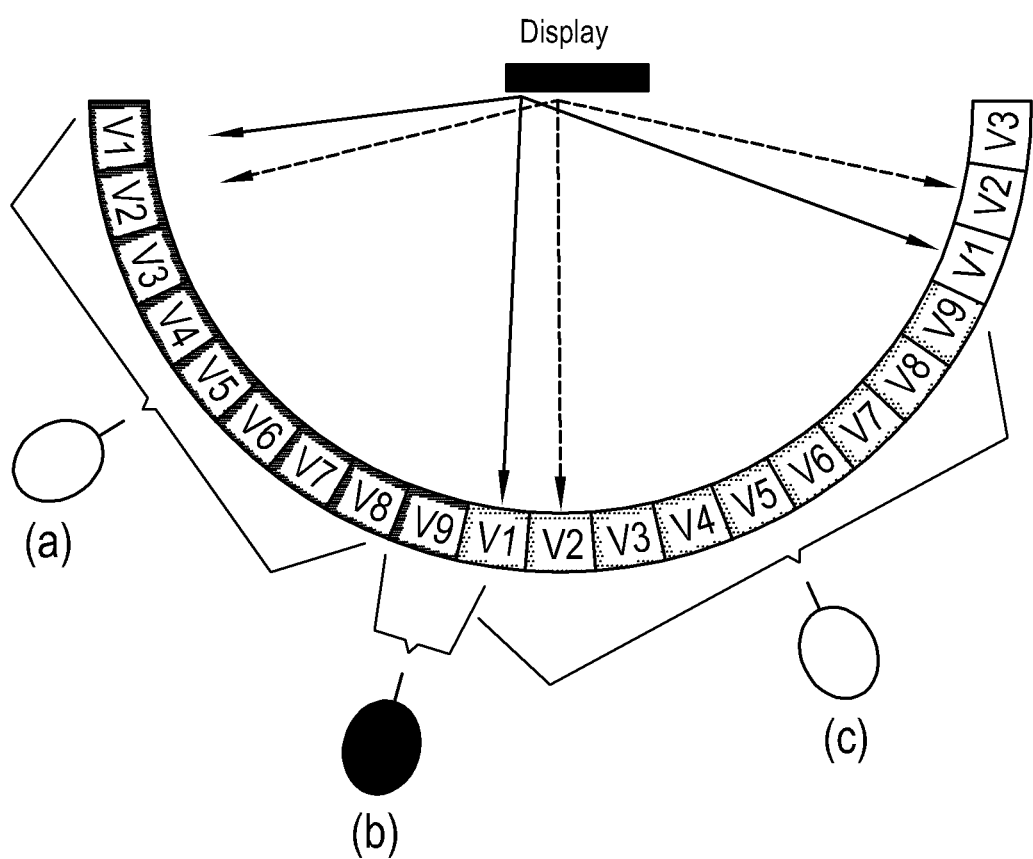

FIG. 3 illustrates an example of a lenticular autostereoscopic 3D display, according to an exemplary embodiment.

FIG. 3 illustrates an example of realizing nine views (or nine viewing angles) by the display device 50. In this case, a user views the display from viewing angles V1 to V9 through the user's left and right eyes depending on a location of the user. To realize a multi view in the lenticular display, the user's location needs be analyzed and the user needs to be located in a non-overlapping viewing angle area.

For example, as shown in FIG. 3, when a user (a) is located in a boundary between views V4 and V5, a dual view may not be realized due to a structure of the views when images shown at the views V4 and V5 are different from each other. Even at the non-overlapping viewing angle area, due to the limitation of the lenticular display, a resolution and brightness of a main image that is viewed in common to a plurality of users may be reduced.

Figure 4:
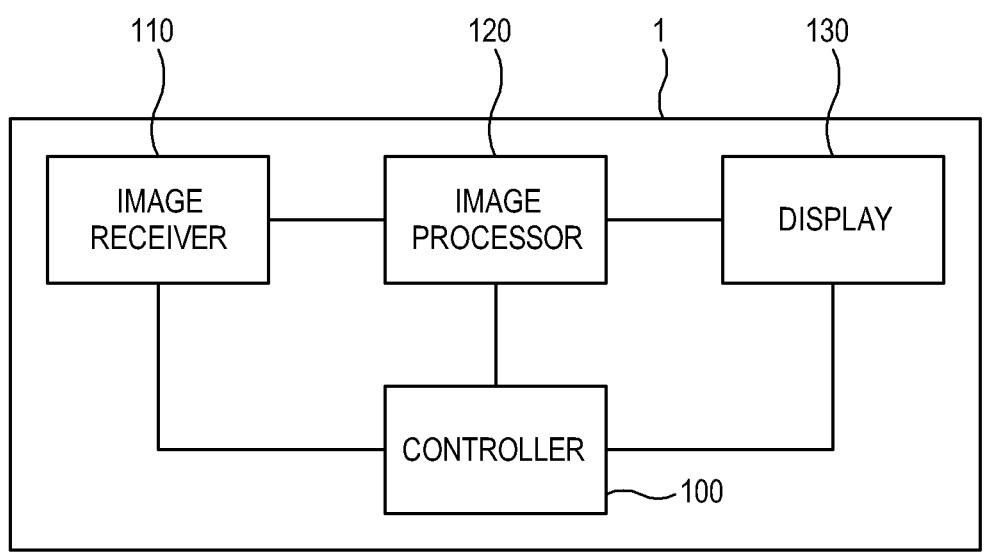
FIG. 4 is a block diagram of a display device according to an exemplary embodiment.

FIG. 4 is a block diagram of a display device 1 according to an exemplary embodiment. As shown therein, the display device 1 according to an exemplary embodiment may include an image receiver 110, an image processor 120, a display 130 and a controller 100. The display device 1 according to an exemplary embodiment may be implemented as, for example, a smart television (TV), a monitor, or a smart display device.

The image receiver 110 may receive image signals and/or image data and transmit the image signals and/or image data to the image processor 120 in a wired or wireless manner. For example, the image receiver 110 may receive broadcasting signals including TV broadcasting signals as image signals from a broadcasting signal transmission device (not shown), receive image signals from imaging devices such as a digital versatile disc (DVD) player or a Blu-ray disc (BD) player, receive image signals from a personal computer (PC), receive image signals through a network such as the Internet or receive image contents as image signals stored in a storage medium such as a universal serial bus (USB) stick. In another exemplary embodiment, image signals may be stored in advance in a storage part (not shown) rather than received through the image receiver 110. The image receiver 110 may vary depending on a standard of a received image signal and an exemplary embodiment type of the display device 1. For example, the image receiver 110 may receive radio frequency (RF) signals, or receive image signals according to standards such as a composite video, a component video, a super video, a Syndicat des Costructeurs d'Appareils Radiorecepteurs et Televiseurs (SCART), a high definition multimedia interface (HDMI), an isplayPort, an unified display interface (UDI) or a wireless HD. When an image signal includes a broadcasting signal, the image receiver 110 may include a tuner to tune the broadcasting signal per channel.

The type of the image processing process performed by the image processor 120 may include, without limitation, decoding corresponding to an image format of image data, de-interlacing for converting interlace video data into progressive image data, scaling for adjusting image data into a preset resolution, noise reduction for improving image quality, detail enhancement, frame refresh rate conversion, etc.

The image processor 120 may be implemented as a system-on-chip (SoC) which integrates the aforementioned functions or as an image processing board that is provided by installing independent elements performing the aforementioned processes in a printed circuit board (PCB) to be installed in the display device 1.

The image processor 120 processes a broadcasting signal including an image signal transmitted by the image receiver 110, and a source image including an image signal supplied by an image supply source. The image processor 120 may output the processed image signal to the display device 1, by which the processed source image may be displayed.

The display 130 may display an image thereon based on the image signal output by the image processor 120. The display 130 may be implemented as various displays including, without limitation, a liquid crystal, a plasma, a light-emitting diode, an organic light-emitting diode, a surface-conduction electron-emitter, a carbon nano-tube, and a nano-crystal.

The display 130 may further include additional elements depending on its embodiment type. For example, when the display 130 is provided as a liquid crystal display, the display 130 may include a liquid crystal display (LCD) panel, a backlight unit for emitting light to the LCD panel, and a panel driving substrate for driving the LCD panel.

The display 130 displays an image thereon based on the image signal processed by the image processor 120. The display 130 may employ an LCD, a plasma display panel (PDP), an organic light emitting diode (OLED), etc. to display an image thereon. In this case, the display 130 may include an LCD panel, a PDP panel or an OLED panel.

The display 130 may drive a panel such as the panel 53 shown in FIG. 1 corresponding to a viewing angle, and may include a lenticular lens, such as the lenticular lens 54 as shown in FIG. 1 to provide brightness corresponding to the viewing angle. The lenticular lens may cover and be attached to a front surface of the display 130. The lenticular lens may be provided corresponding to a size and s number of a panel that outputs auxiliary images at viewing angles.

The controller 100 may control a plurality of images including at least one of a first auxiliary image, a second auxiliary image that is different from the first auxiliary image, and a third auxiliary image that is used to reduce interference between the first and second auxiliary images 11 and 12. The controller 100 may display a main image, and the auxiliary images in a predetermined region of the main image 20. The controller 100 may control the display 130 to activate the panel of the display 130 with respect to the regions of the auxiliary images 11 to 13 and to generate the auxiliary images 11 to 13 to be visible corresponding to the number of viewing angles. The controller 100 may include a processor, a microprocessor, a central processing unit (CPU), or an integrated circuit for executing programmable instructions stored in a storage, e.g., a memory.

Figure 5:
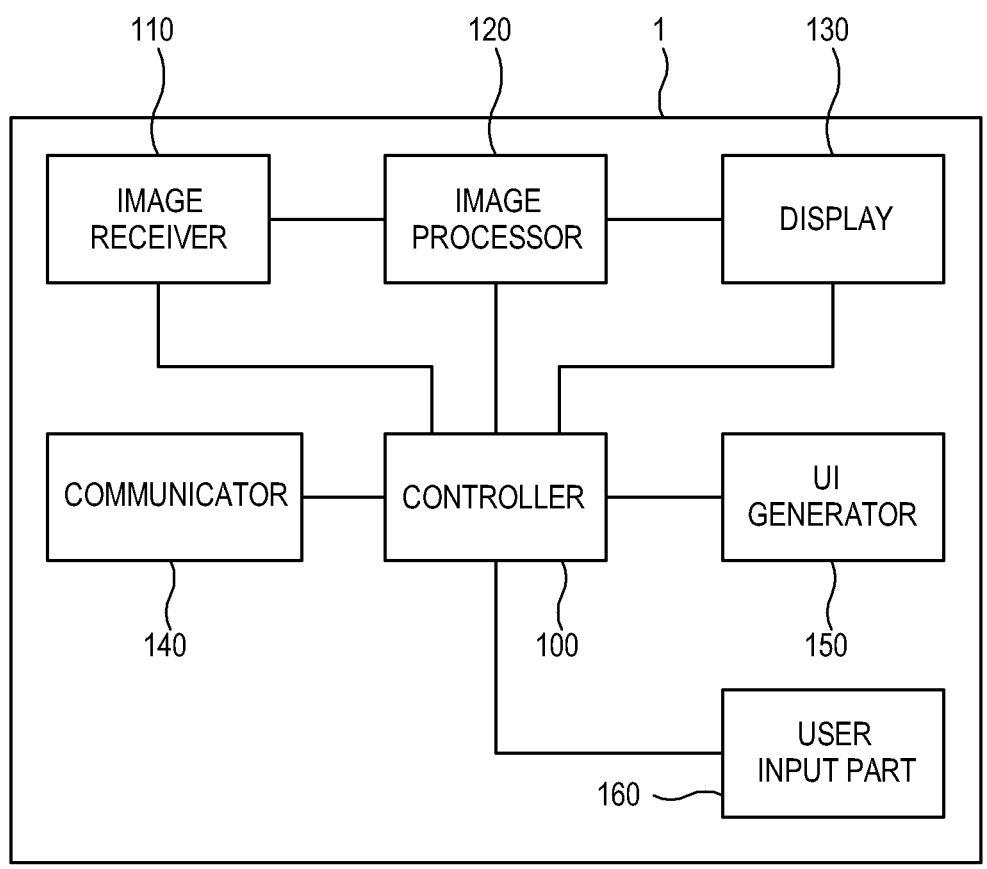
FIG. 5 is a block diagram of a display device according to another exemplary embodiment.

FIG. 5 is a block diagram of a display device 1 according to another exemplary embodiment. The display device 1 according to the another exemplary embodiment may include substantially the same elements as those shown in FIG. 4, and may further include a communicator 140, a user interface (UI) generator 150 and a user input part 160.

The communicator 140 may receive signals from an external input and transmit the signals to the image processor 120 or the controller 100. Although it is shown in FIG. 5 that the communicator 140 is connected to the image processor through the controller 100, exemplary embodiments are not limited thereto. For example, the communicator 140 may be directly connected to the image processor. The communicator 140 may be connected to various external input cables and receive signals from the external input in a wired manner, or may receive signals that are transmitted wirelessly, according to a preset wireless communication standard.

The communicator 140 may include a plurality of connectors (not shown) to which respective cables are individually connected. The communicator 140 may receive signals from a connected external input, e.g., receive broadcasting signals, image signals or data signals according to HDMI, USB or component, or receive communication data through a communication network.

The communicator 140 may further include various additional elements such as a wireless communication module (not shown) for wireless communication or a tuner (not shown) for tuning a broadcasting signal depending on a design type of the display device 1 as well as elements for transmitting and/or receiving signals or data from an external device. The communicator 140 may transmit at least one from among information, data, and signals of the display device 1 to the external device and receive signals from the external device. The communicator 140 may not be limited to the element for receiving signals from an external device, and may also be implemented as an interface for interactive communication. The communicator 140 may receive a control signal from a plurality of control devices to select a UI. The communicator 140 may include a communication module for near field communication (NFC) such as Bluetooth, infrared (IR), ultra wideband (UWB) and Zigbee, or a known communication port for wired communication. The communicator 140 may be used for various purposes including transmission and reception of commands for manipulating a display and data in addition to a control signal for selecting a UI.

The UI generator 150 may generate a UI to operate an application program. The generated UI may include a plurality of sub UIs which may be provided in the form of an icon or a text. When a user selects a particular sub UI through the display device 1, an application program may be operated corresponding to the selected sub UI. That is, the respective sub UIs may be generated for a plurality of functions or events to operate corresponding application programs by the display device 1.

The UI generator 150 may perform a software or hardware function to generate and control a UI displayed by the display 130, and such function may be performed by the controller 100. This will be described in more detail later. That is, the UI generator 150 may not be necessarily implemented as an additional chipset or an additional microprocessor. The UI generator 150 may generate a UI to display the auxiliary images in a predetermined region of the display 130.

The user input part 160 transmits preset various control commands or information to the controller 100 by a user's manipulation and input. The user input part 160 may be implemented as a menu key or an input panel that is installed in an external side of the display device 1, or as a remote controller that is separated and spaced apart from a user terminal. Alternatively, the user input part 160 may be integrally formed in the display 130. When the display 130 is a touch screen, a user may touch an input menu displayed by the display 130 to transmit a preset command to the controller 100.

The user input part 160 may receive a user's motion. The user's motion may include a touch input. The user input part 160 may directly receive the user's motion, or receive information of the user's motion from an external device.

The controller 100 may adjust a viewing angle of a first auxiliary image, a second auxiliary image, and a third auxiliary image. The auxiliary images may be images of, for example, a channel, contents or a web browser that are different from the main image, or may be stored images. The auxiliary images may be images that are provided by an external device connected to the display device 1.

The controller 100 may adjust a viewing angle of the third auxiliary image so that the first and second auxiliary images are not adjacent to each other. The auxiliary images may be different images displayed at respective viewing angles. In an exemplary embodiment, a plurality of viewing angles including nine views as shown in FIG. 1 may be provided. When three users desire to view different images as the first to the third auxiliary images, the first to the third auxiliary images may be distributed at three viewing angles, e.g., V1 to V3, V4 to V6, and V7 to V9 (refer to FIG. 3) for the three users. When there is a boundary among the different auxiliary images and the first auxiliary image and the second auxiliary image have viewing angles that are adjacent to each other, a user may move to the boundary of the viewing angle at which the first and second auxiliary images 11 and 12 are adjacent to each other. When a user views the first auxiliary image with the user's left eye, and views the second auxiliary image with the user's right eye, the first and second auxiliary images may overlap each other to be difficult to recognize and the user may feel dizzy. To prevent such problem, when the third auxiliary image may be inserted between the first and second auxiliary images such that the first and second auxiliary images are not adjacent to each other. Accordingly, a user may not simultaneously view the first and second auxiliary images 11 and 12 even while moving.

The controller 100 may control the UI generator 150 to generate a UI for displaying the auxiliary images in a predetermined region of the display 130. The controller 100 may activate the panel of the display 130 corresponding to the region of the auxiliary images displayed in the predetermined region of the display 130 to output images at a plurality of viewing angels. In an exemplary embodiment, the plurality of viewing angles may be set by a user or a manufacturer.

The controller 100 may relocate the displayed auxiliary images. The auxiliary images may be generated at any location in the display 130. The controller 100 may activate the panel of the display 130 with respect to the regions of the auxiliary images. The controller 100 may activate the panel of the display 130 by detecting a movement of the auxiliary images. A user may adjust a size of the auxiliary images. The controller 100 may activate the panel of the display 130 corresponding to the regions of the auxiliary images. The main image 20 may be provided with a resolution that is not reduced and provide the auxiliary images with a reduced resolution depending on viewing angles corresponding to the auxiliary images. Also, the resolution of the region of the main image 20 that corresponds to the region of the auxiliary images 11 to 13 may be reduced. Therefore, when the auxiliary images 11 to 13 are located in a center of the display 130, i.e., in a center of a region of the main image 20, the main image 20 with a relatively higher resolution may be not viewed.

Figure 6:
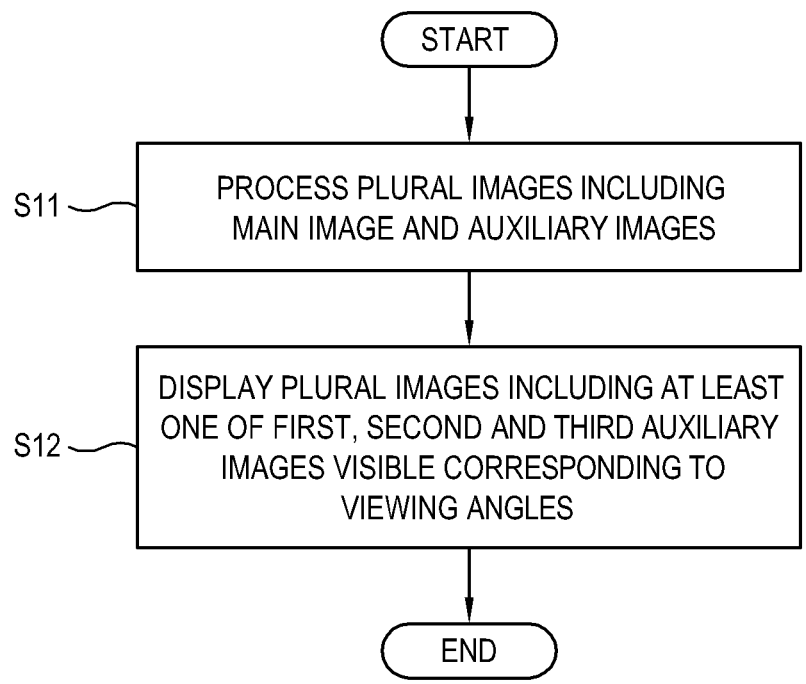
FIG. 6 is a control flowchart showing operations of a display device according to an exemplary embodiment.

FIG. 6 is a control flowchart showing operations of a display device according to an exemplary embodiment.

A plurality of images including the main image and the auxiliary images are processed (operation S11).

The plurality of images including at least one of first, second and third auxiliary images are displayed such that the first to the third auxiliary images are visible at corresponding viewing angles (operation S12). While the main image is displayed, the controller 100 checks the regions of the auxiliary images, and activates the panel of the display 130, and may display the plurality of images such that the auxiliary images are visible at corresponding viewing angles.

Figure 7:
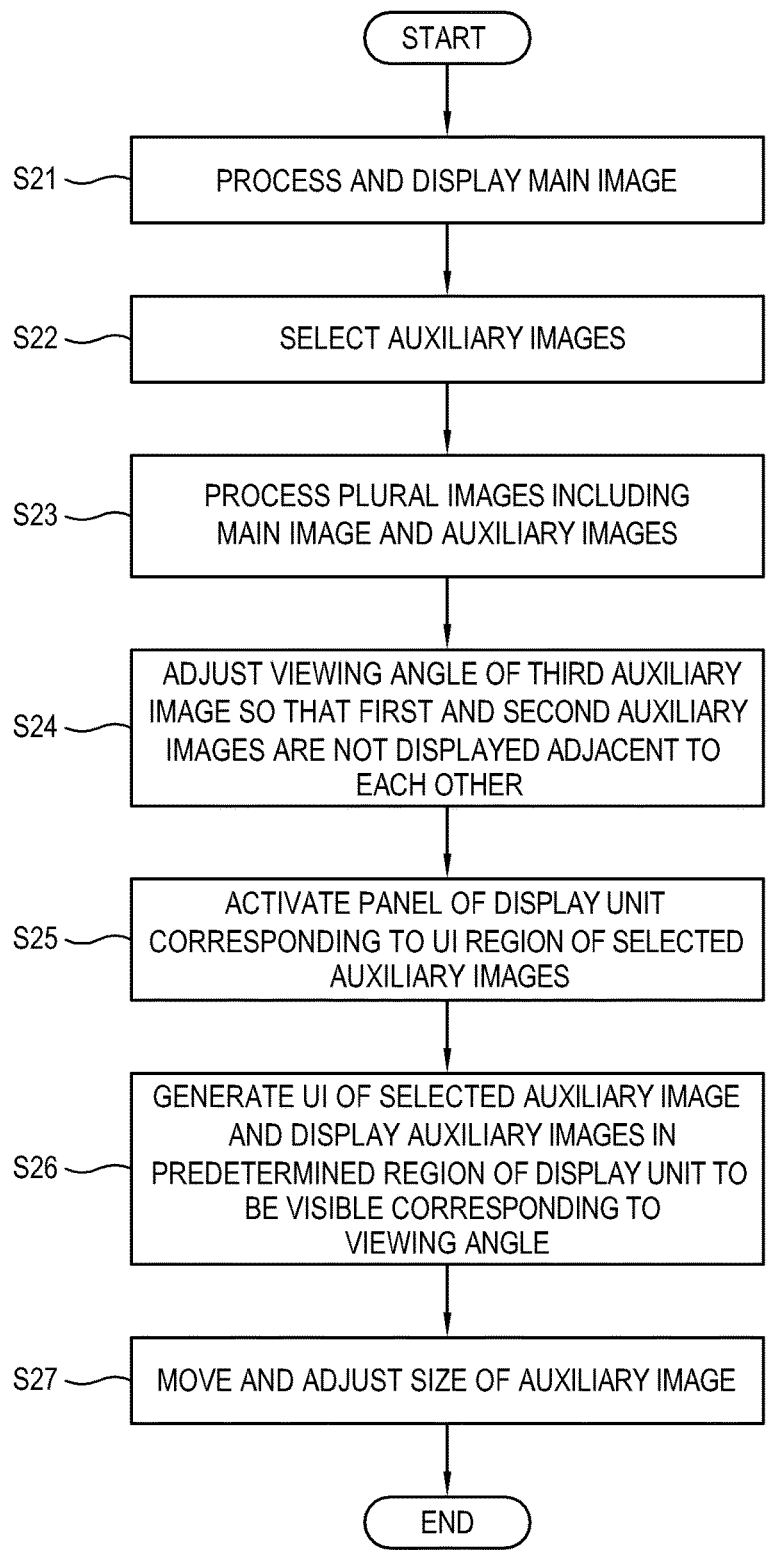
FIG. 7 is a control flowchart showing operations of a display device according to another exemplary embodiment.

FIG. 7 is a control flowchart showing operations of a display device according to another exemplary embodiment.

A main image is processed and displayed on the display 130 (S21).

Auxiliary images are selected by at least one user (operation S22).

A plurality of images including the main image and the auxiliary images are processed (operation S23).

The viewing angle of the third auxiliary image is adjusted so that the first and second auxiliary images are not adjacent to each other (operation S24).

The panel of the display 130 corresponding to the UI region of the selected auxiliary images is activated (operation S25).

The UI of the selected auxiliary images is generated and the selected auxiliary images are displayed in a predetermined region of the display 130 to provide the auxiliary images visible corresponding to the viewing angle (operation S26).

Positions of the auxiliary images may be moved by a user, and the size of the auxiliary images may be adjusted (operation S27).

Figure 8:
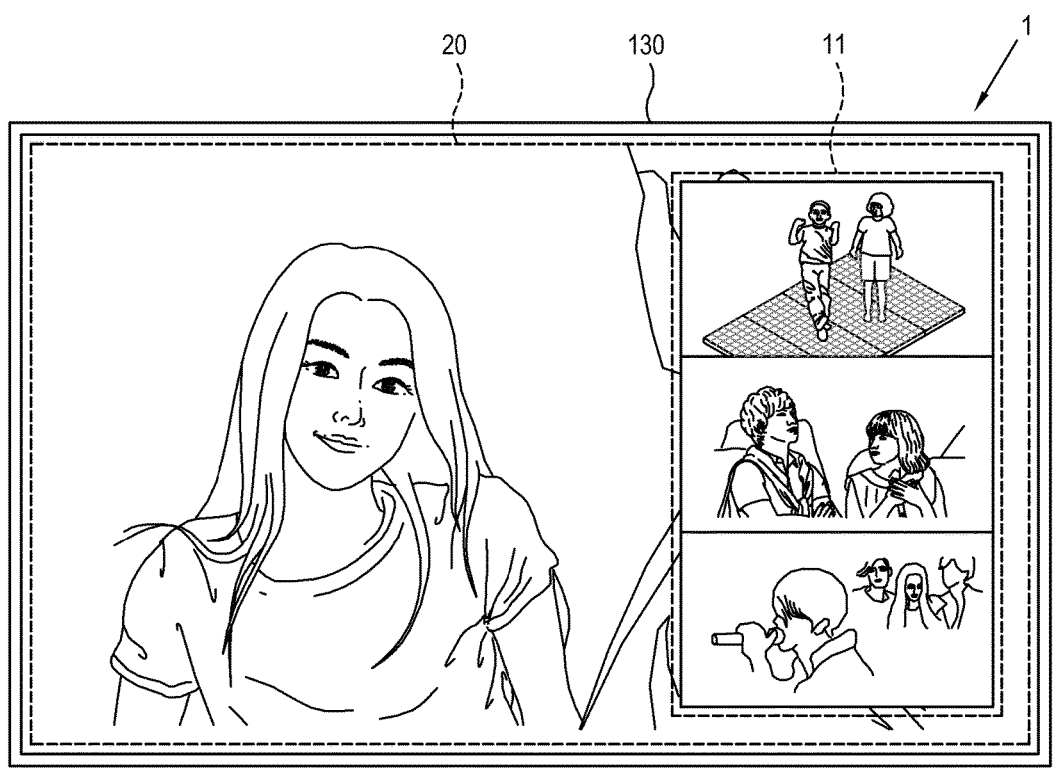
FIG. 8 illustrates an example of a main image and auxiliary images of a display device according to an exemplary embodiment.

FIG. 8 illustrates an example of a main image and auxiliary images of a display device according to another exemplary embodiment.

FIG. 8 illustrates a screen of the display 130 that is viewed at a certain viewing angle. A main image 20 may be viewed by a user, and a first auxiliary image 11 of a channel that is different from the main image 20 may be viewed together with the main image 20. A user viewing at a certain viewing angle may select and view the first auxiliary image 11 of a channel that is different from the main image 20, i.e., a different image from the main image 20 at only a certain viewing angle at which the user is located relative to the display 130. A user may view the first auxiliary image 11 at respective viewing angles with the user's left and right eyes, respectively. In this case, a user may view 3D images. However, when a user moves to another viewing angle, such that the viewing angle of a second auxiliary image is located between the viewing angles of the user's left and right eyes, the first and second auxiliary images may be viewed as overlapping each other. When a user may view the first auxiliary image 11 with the user's left eye and view a third auxiliary image with the user's right eye from a location where the user initially views the images, there is no difficulty in viewing the first auxiliary image 11 and even when a user moves to the viewing angle of the second auxiliary image 12, the first and second auxiliary images 11 and 12 may not be viewed as overlapping each other because of the third auxiliary image 13 positioned therebetween.

Figure 9:
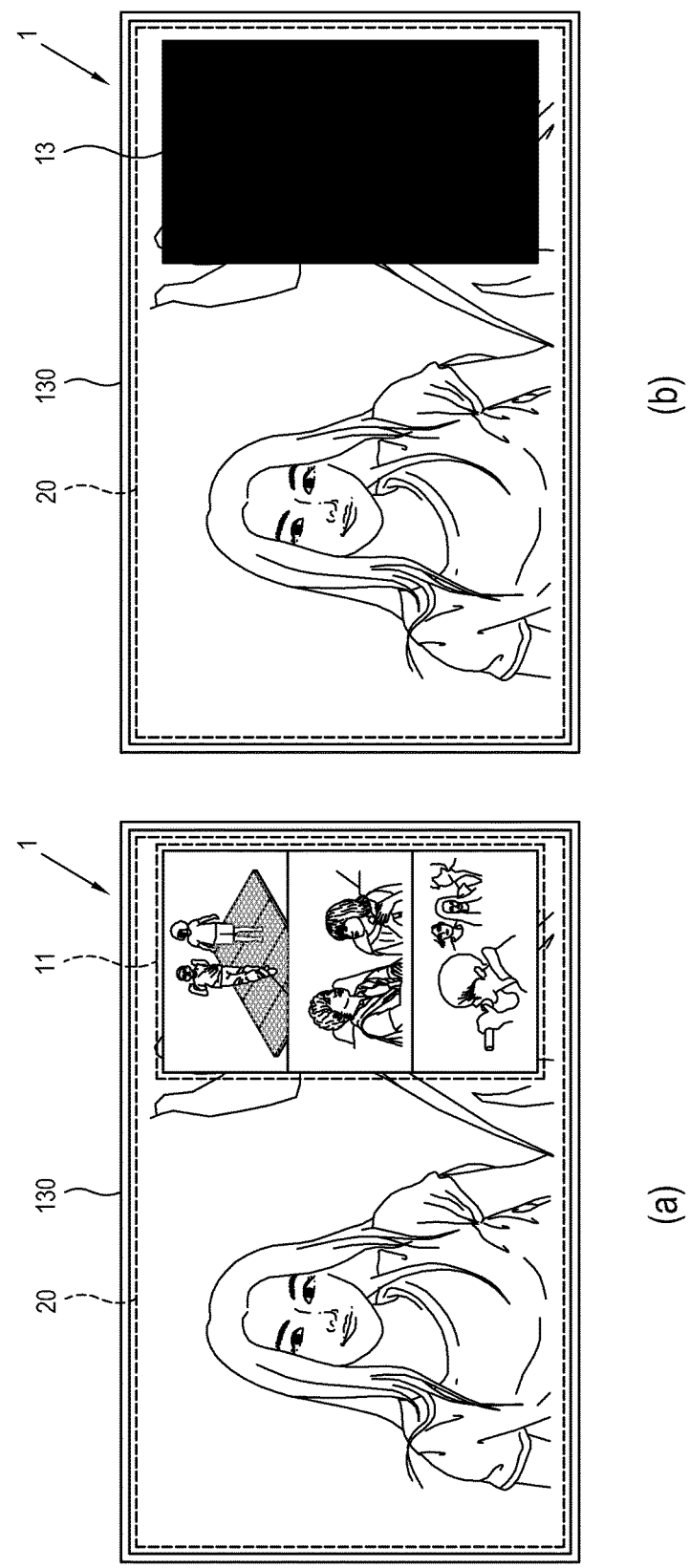
Figure 10:
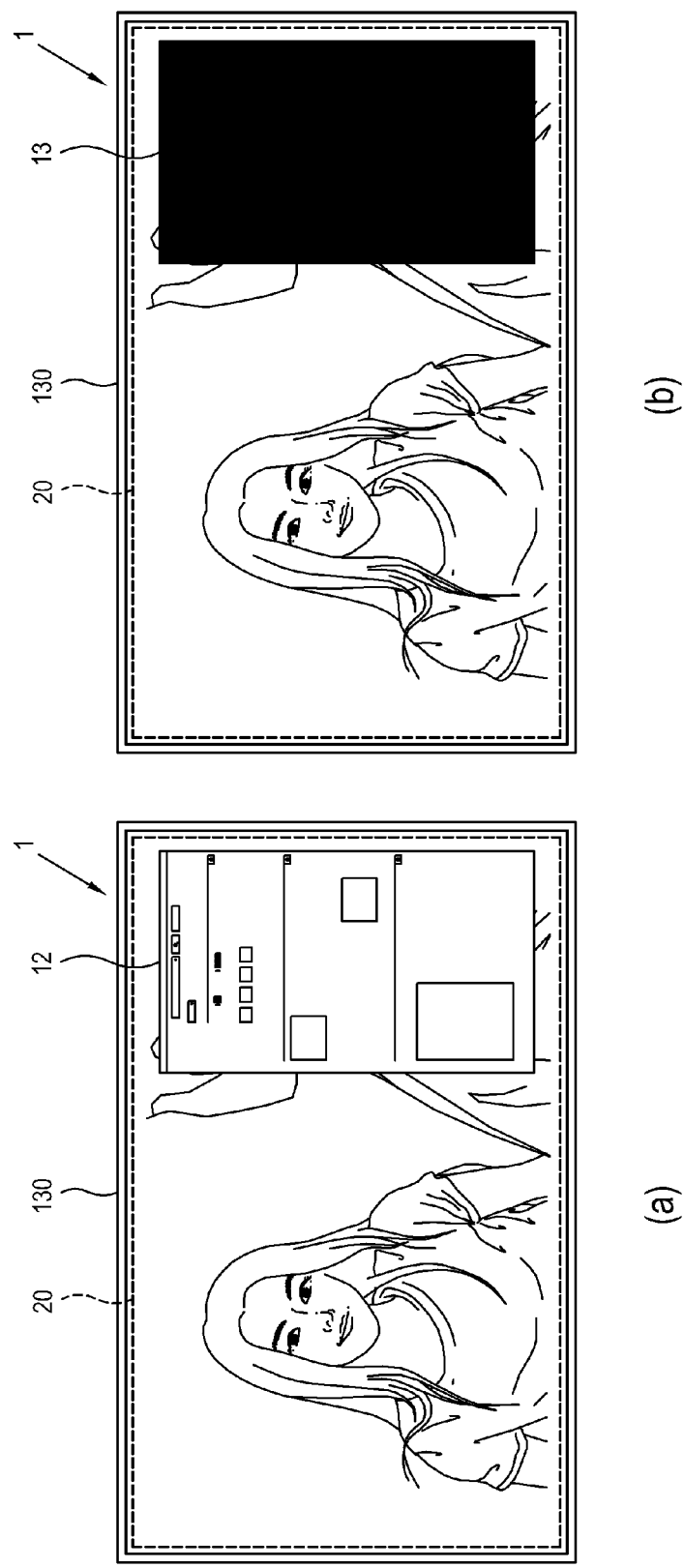

FIGS. 9, 10 and 11 illustrate examples of viewing a display device 1 by a user according to various exemplary embodiments.

FIGS. 9(a) and 9(b) illustrate screens viewed by a left eye and a right eye of a first user. FIGS. 10(a) and 10(b) illustrate screens viewed by a left eye and a right eye of a second user.

When auxiliary images 11 to 13 are displayed in an exemplary 3D display as shown in FIG. 3, the auxiliary images 11 to 13 may be divided into a first group comprising first auxiliary images 11 to be viewed at viewing angles V1, V5 and V9, a second group comprising second auxiliary images 12 to be viewed at viewing angles V3 and V7 and a third group comprising third auxiliary images 13 to be viewed at viewing angles V2, V4, V6, and V8.

The first auxiliary image 11 and the second auxiliary image 12 which are provided visible to the first and second groups are displayed, and the third auxiliary image 13 is displayed with respect to the third group to reduce interference between the first and second groups. In an exemplary embodiment, the third auxiliary image 13 may be provided as a dark screen (or a black image) to reduce crosstalk. Also, this may increase user convenience since, for example, it is easier for a user to conduct web browsing with the user's left eye while viewing a dark screen with the user's right eye than to conduct web browsing with the user's left eye and to search YouTube with the user's right eye.

As shown in FIGS. 9 and 10, the first and second users 1 and 2 may view the main image 20 without reduced resolution and view the auxiliary images 11 to 13 with only a left or right eye. When the second user 2 moves the second user's head to the left or right or moves from a position between, for example, the viewing angles V4 and V5 to a position between, for example, the viewing angles V3 and V4, an image viewed by a left eye of the second user 2 may be changed from the third auxiliary image 13 at the viewing angle V4 to the first auxiliary image 11 at the viewing angle V3, and an image viewed by a right eye of the second user 2 may be changed from the second auxiliary image 12 at the viewing angle V5 to the third auxiliary image 13 at the viewing angle V4. Thus, a user may simply need to move the user's head to the left or right to change the auxiliary image to be viewed by the user's left or right eye.

Figure 12:
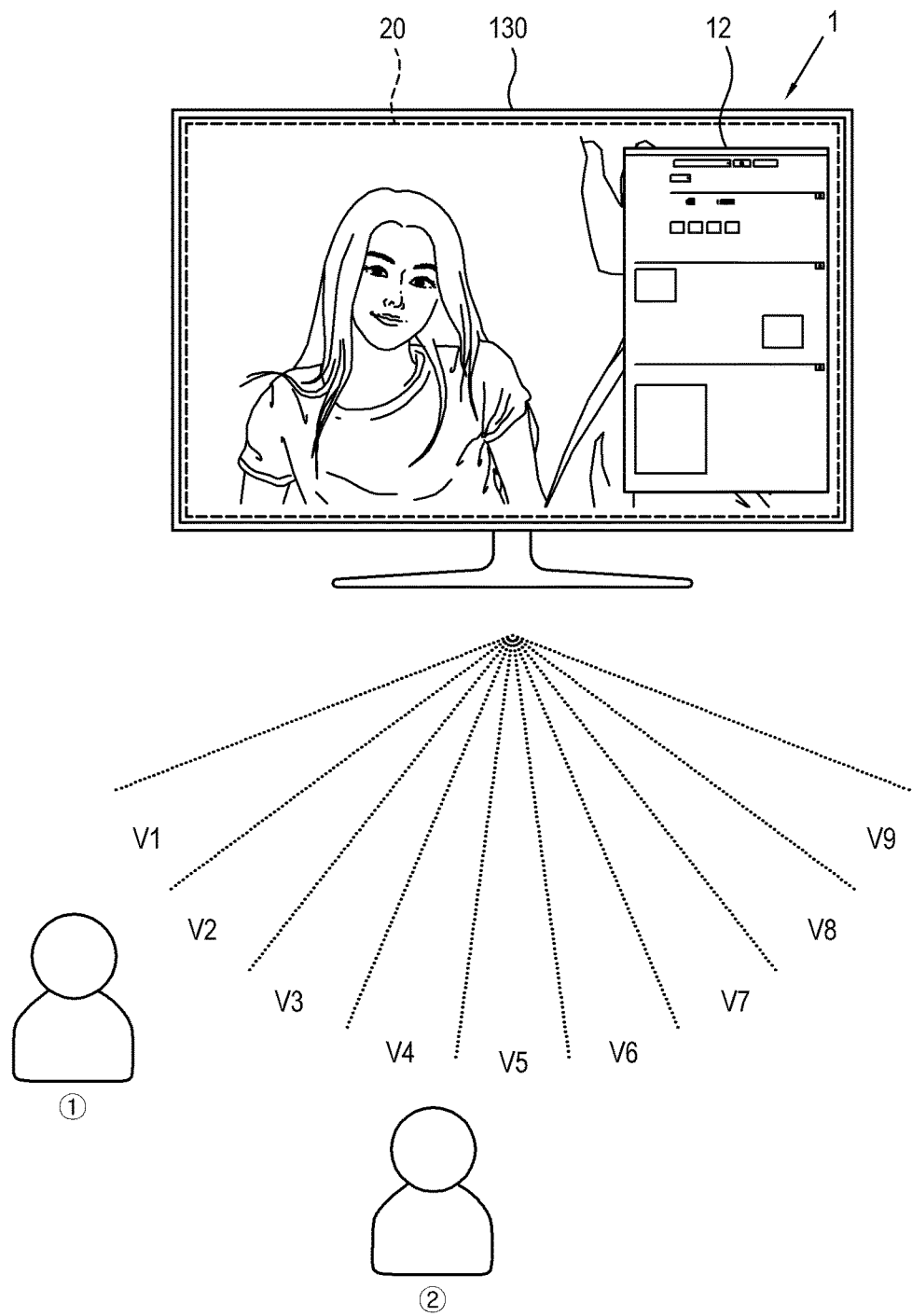
FIG. 12 illustrates an example of a screen shown in various viewing angles according to an exemplary embodiment.

FIG. 11 illustrates an example of viewing a display device 1 by a plurality of users according to an exemplary embodiment. FIG. 12 illustrates an example of a screen shown in various viewing angles according to an exemplary embodiment.

When users' locations may be analyzed and determined that users are located at overlapping viewing angles as shown in FIG. 12. For example, a user 1 is located at V1 and V2, and a user 2 is located at V4 and V5. In this case, referring to FIG. 11(a), the user 1 may be provided with a region A, resolution of which has been reduced compared to the main image 20, wherein the user 2 may be provided with the first auxiliary image 11 displayed in the region A. Thus, the user 1 may view the main image 20 only, resolution of which has been reduced in the region A, and the user 2 may view the main image 20 with the user's left eye at the viewing angle V4 and a second auxiliary image 12 as shown in FIG. 11(b).

By using a display device 1 according to exemplary embodiments, users may view the main image 20 with the original resolution of the main image 20, and view the respective auxiliary images 11 to 13 corresponding to viewing angles of the users. Thus, when the users move to another viewing angle, the auxiliary images 11 to 13 are not displayed to overlap each other.

As described above, in a display device and a control method thereof according to exemplary embodiments, a predetermined image is inserted between images to reduce interference between the images. Therefore, a plurality of users may view a main image without deterioration of image quality and view auxiliary images corresponding to respective viewing angles of the plurality of users and the auxiliary images may be substantially prevented from being displayed as overlapping each other when positions of the users are changed.

A control method of a display device according to exemplary embodiments may be coded as software and be stored in a non-transitory readable medium. The non-transitory readable medium may be built in various types of image processing units or imaging apparatuses and support the image processing units or imaging apparatuses to carry out the methods as described above.

A non-transitory readable medium is a medium which does not store data temporarily such as a register, cash, and memory but stores data semi-permanently and is readable by devices. More specifically, the aforementioned various applications or programs may be stored and provided in a non-transitory readable medium such as a compact disk (CD), a digital video disk (DVD), a hard disk, a Blu-ray disk, a universal serial bus (USB), a memory card, and a read-only memory (ROM).

Although a few exemplary embodiments have been shown and described, it will be appreciated by those skilled in the art that changes may be made in these exemplary embodiments without departing from the principles and spirit of the invention, the range of which is defined in the appended claims and their equivalents.

What is claimed is:

1. A display device comprising:
    an image processor configured to process an image data;
    a display configured to display an image based on the processed image data; and
    a controller configured to:
        display a first image and a second image on the display, the first image having a first viewing angle where the first image is viewable to a user and the second image having a second viewing angle where the second image is viewable to the user, and
        display a third image having a third viewing angle where the third image is viewable to the user, the third viewing angle being between the first viewing angle and the second viewing angle, wherein the controller is configured to adjust the third viewing angle to have a first boundary, with respect to the first viewing angle, at which the first image is not viewable to one of eyes of the user, and a second boundary, with respect to the second viewing angle, at which the first image is not viewable to another one of the eyes of the user, according to a viewing of the user who moves from the first viewing angle to the second viewing angle.

2. The display device according to claim 1, wherein the controller is configured to adjust the first viewing angle, the second viewing angle, and the third viewing angle according to a location of a plurality of users.

3. The display device according to claim 1, wherein the controller is configured to adjust the third viewing angle such that the first image and the second image are not viewable at viewing angles adjacent to each other.

4. The display device according to claim 3, further comprising a user interface (UI) generator configured to generate the first image, the second image, and the third image, wherein
the controller is configured to control the UI generator to generate a UI to display at least one of the first image, the second image, and the third image in a predetermined region of the display.

5. The display device according to claim 4, wherein the controller is configured to move a position of at least one of the displayed first image, the second image, and the third image.

6. The display device according to claim 1, wherein the third image comprises a black image.

7. A method of controlling a display device, the control method comprising:
displaying a first image and a second image, the first image having a first viewing angle where the first image is viewable to a user and the second image having a second viewing angle where the second image is viewable to the user; and
displaying a third image having a third viewing angle where the third image is viewable to the user, the third viewing angle being between the first viewing angle and the second viewing angle,
wherein the displaying the third image comprises adjusting the third viewing angle to have a first boundary, with respect to the first viewing angle, at which the first image is not viewable to one of eyes of the user, and a second boundary, with respect to the second viewing angle, at which the first image is not viewable to another one of the eyes of the user, according to a viewing of the user who moves from the first viewing angle to the second viewing angle.

8. The control method according to claim 7, wherein the displaying the third image comprises adjusting the first viewing angle, the second viewing angle, and the third viewing angle according to a location of a plurality of users.

9. The control method according to claim 7, wherein the displaying the third image comprises adjusting the third viewing angle such that the first image and the second image are not viewable at viewing angles adjacent to each other.

10. The control method according to claim 9, wherein the displaying the third image comprises generating a UI to display at least one of the first image, the second image, and the third image in a predetermined region of a display.

11. The control method according to claim 7, wherein the displaying the third image comprises moving a position of at least one of the displayed first image, the second image, and the third image.

12. The control method according to claim 7, wherein the third image comprises a black image.

13. A non-transitory computer readable recording medium having recorded thereon a program executable by a computer for performing the control method according to claim 7.

* * * * *